(12) United States Patent
Macher et al.

(10) Patent No.: US 6,497,504 B2
(45) Date of Patent: *Dec. 24, 2002

(54) SUN VISOR HAVING AN ELECTRO-LUMINESCENT FILM FOR ILLUMINATING A MIRROR

(75) Inventors: David Macher, Voitsberg; Heinz Zorn, Eggersdorf, both of (AT)

(73) Assignee: Magna Reflex Holding GmbH, Assamstadt (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/378,111

(22) Filed: Aug. 20, 1999

(65) Prior Publication Data

US 2001/0024370 A1 Sep. 27, 2001

Related U.S. Application Data

(63) Continuation of application No. 08/972,915, filed on Nov. 18, 1997.

(30) Foreign Application Priority Data

Oct. 13, 1997 (AT) .............................................. 01730/97

(51) Int. Cl.[7] ................................................. B60Q 3/02
(52) U.S. Cl. .......................... 362/492; 362/84; 362/135; 362/136; 362/137
(58) Field of Search .......................... 362/492, 84, 135, 362/136, 137

(56) References Cited

U.S. PATENT DOCUMENTS

| | | | | |
|---|---|---|---|---|
| 3,111,275 A | * | 11/1963 | Pfisterer | 362/136 |
| 3,344,269 A | * | 9/1967 | Brown | 362/84 |
| 3,926,470 A | * | 12/1975 | Marcus | 296/97.5 |
| 4,864,473 A | * | 9/1989 | Tokarz et al. | 362/490 |
| 4,947,296 A | * | 8/1990 | Takeuchi et al. | 362/135 |
| 4,979,079 A | * | 12/1990 | Tawaraya | 362/135 |
| 5,434,013 A | | 7/1995 | Fernandez | |
| 5,482,614 A | | 1/1996 | Kondo et al. | |
| 5,570,945 A | | 11/1996 | Chien et al. | |
| 5,775,016 A | * | 7/1998 | Chien | 40/544 |

FOREIGN PATENT DOCUMENTS

DE 29706601 4/1997

\* cited by examiner

Primary Examiner—Sandra O'Shea
Assistant Examiner—Ismael Negron
(74) Attorney, Agent, or Firm—Clark Hill PLC

(57) ABSTRACT

A sun visor assembly for an automotive vehicle has a sun visor panel and at least one lighting element flush mounted on the sun visor panel. The lighting element is an electroluminescent film electrically connected to a triggering device for energizing the electroluminescent film illuminating the sun visor panel.

4 Claims, 7 Drawing Sheets

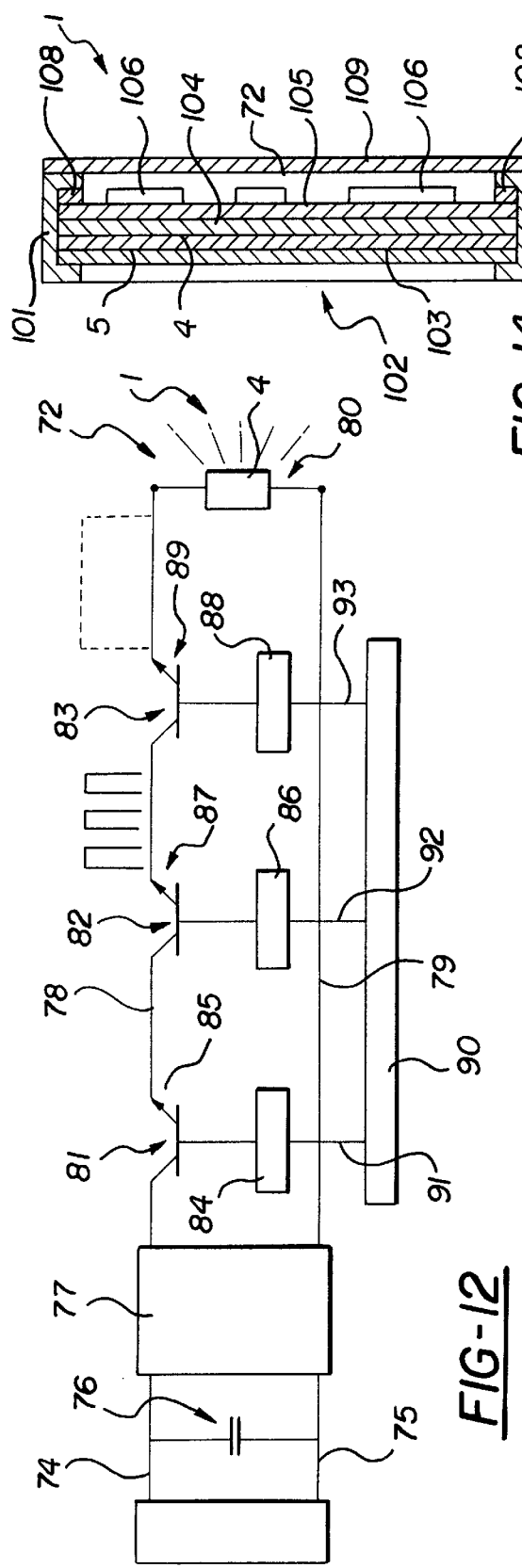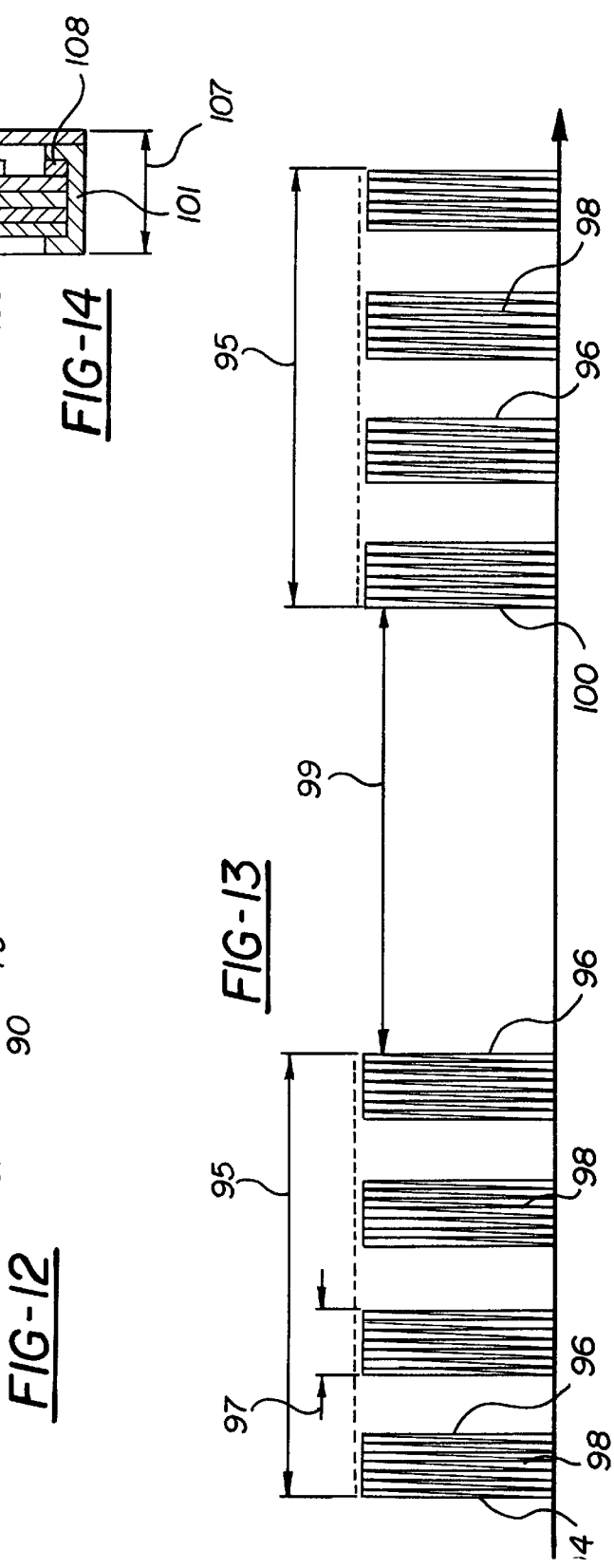
FIG-12
FIG-13
FIG-14

SUN VISOR HAVING AN ELECTRO-LUMINESCENT FILM FOR ILLUMINATING A MIRROR

RELATED APPLICATIONS

This application is a continuation of co-pending application Ser. No. 08/972,915 filed Nov. 18, 1997, which, in turn, claims priority to Austrian application no. A 1730/97 filed Oct. 13, 1997.

FIELD OF INVENTION

The present invention relates to a sun visor having an illuminated film for illuminating a vanity mirror. In particular, this invention relates to a sun visor having an illuminating film for providing a thin profile sun visor.

BACKGROUND OF THE INVENTION

In a typical up scale vehicle, the sun visor is provided with a vanity mirror which has a light source for illuminating the mirror for use. Typically, the light will be responsive to the opening of a mirror cover. The light source for prior art sun visors has been incandescent light bulbs. As a result, sun visors must have a thickness sufficient to mount the bulb behind a suitable lens.

The prior art sun visor has provided years of satisfactory service. However, current automobile design trends are dictating lighter weight parts with lower energy consumption. Thus, there exists a need for eliminating incandescent lighting from sun visors.

SUMMARY OF THE INVENTION

The disadvantages of the prior art may be overcome by providing a sun visor assembly having an electroluminescent film for illuminating the sun visor.

According to one aspect of the invention, there is provided a sun visor assembly for an automotive vehicle which has a sun visor panel and at least one lighting element flush mounted on the sun visor panel. The lighting element is an electroluminescent film electrically connected to a triggering device for energizing the electroluminescent film illuminating the sun visor panel.

According to another aspect of the invention, there is provided a combination comprising a sun visor and an illuminated film. The illuminated film has an electroluminescent layer which is mounted within a carrier film and enclosed by a transparent protective layer.

BRIEF DESCRIPTION OF THE DRAWINGS

FIG. 12 is a circuit diagram for control of the lighting device according to the invention.

FIG. 13 is a diagram of a signal configuration for triggering the lighting device according to the invention.

FIG. 14 is a further embodiment of a construction of the lighting device according to the invention.

DETAILED DESCRIPTION OF THE PREFERRED EMBODIMENT

Figure 1:
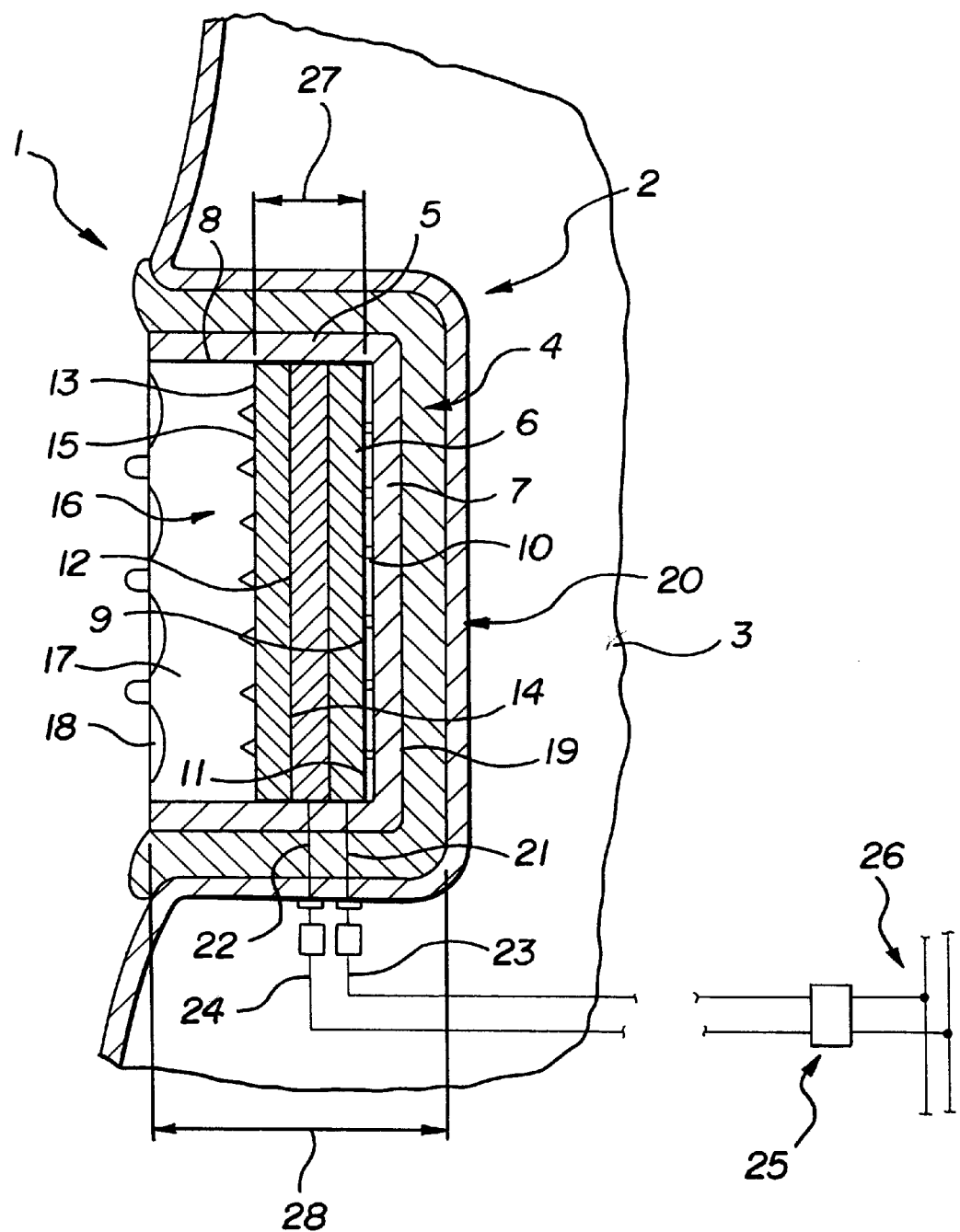
FIG. 1 is a top plan view of a sun visor assembly of the present invention.

Referring to FIG. 1, there is illustrated a sun visor assembly 10 of the present invention. The sun visor assembly 10 generally comprise a sun visor panel 12, a mirror 14, and lighting elements 16 and 18.

Sun visor panel 12 is of a conventional styrene foam and material covered construction, well known in the art. Sun visor panel 12 has a hinge pin 20 for selectively connecting the sun visor panel 12 to the headliner of the vehicle.

Figure 6:
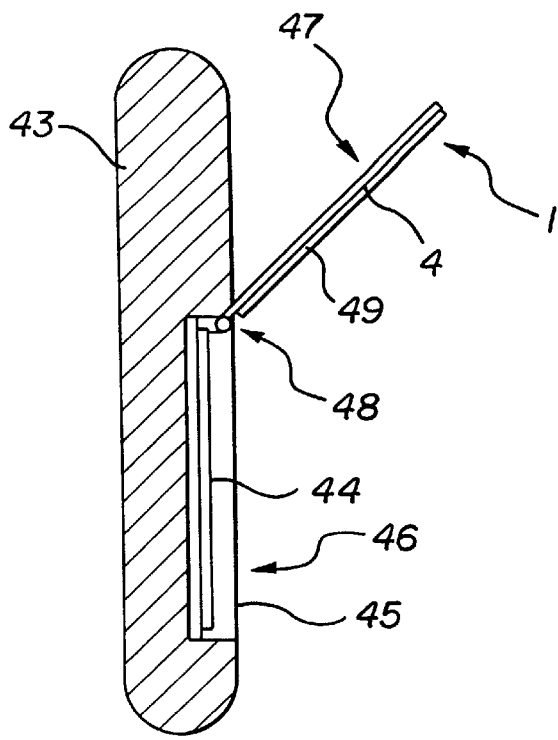
FIG. 6 is a top plan view of a fourth embodiment of a sun visor assembly of the present invention.

Mirror 14 is mounted within a well 22 in the face of the sun visor panel 12 to lie flush therewith. Lighting elements 16 and 18 surround the mirror 14. The present embodiment illustrates the lighting elements 16 and 18 and being adjacent the upper and lower edges of the mirror 14. However, the lighting elements 16 and 18 could be along the side edge of the mirror as illustrated in phantom lines and identified as lighting elements 116 and 118. Moreover, the entire periphery of the mirror 14 could have a single surrounding lighting elements 216 as illustrated in FIG. 6.

Figure 2:
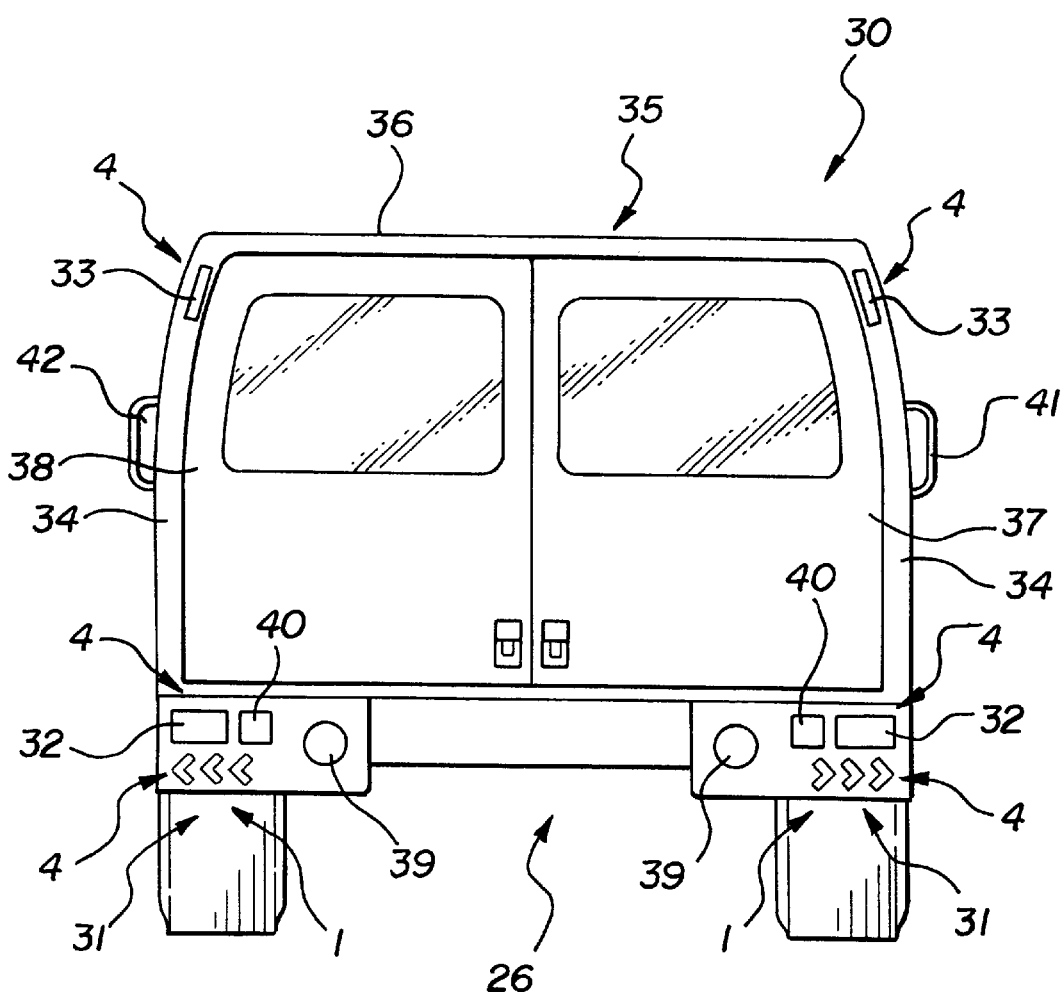
FIG. 2 is a cross-sectional view of the sun visor assembly taken along the line [II—II] of FIG. 1.

Referring to FIG. 2, the lighting element 16 is shown mounted within the well 22 defined in the surface of the sun visor panel 12. A plastic liner 24 is mounted within the well 22 and is sized to receive the lighting element 16. Plastic liner 24 is preferably a self-adhesive material and operates to isolate the lighting element 16 from vibration and shock.

The lighting element 16 generally comprises a carrier film 26 which is well shaped. The bottom of carrier film 26 has surface structure which forms a reflector layer 28. Overlying the reflector layer 28 is an electroluminescent film comprising electroluminescent layer 30 and 31. Overlying the electroluminescent film layer 30 is a protective layer 32. For further protection a second protective layer 34, preferably with optical elements 36 formed thereon, overlies the protective layer 32. Contact terminals 38 and 40 are in electrical contact with the electroluminescent layers 30 and 31. Contact terminals are electrically connected to a triggering device 42 which is connected to a source of electrical power 44. Triggering device 42 is constructed and arranged to open and close the electrical circuit for illuminating the lighting element 16. The triggering event can be operator input or some other external event.

The triggering device 42 generates a series of high and low frequency pulses to trigger the electroluminescent film layers 30 and 31 for illumination. Electroluminescent films are known in the art. U.S. Pat. No. 5,482,614 more particularly describes the composition and manufacture of such films. However, it is expressly understood that the present invention is not limited to the particular films described therein and that any electroluminescent films are contemplated to be within the scope of the present invention.

Figure 7:
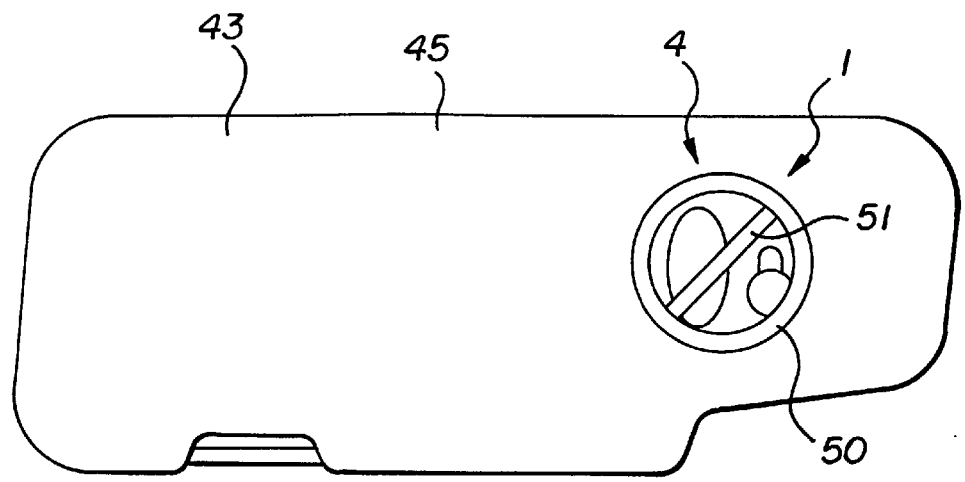
FIG. 7 is a circuit diagram of the controller of the sun visor assembly of FIG. 1.

Referring now to FIG. 7, the circuit diagram for the triggering device 42 is illustrated. Triggering device 42 generally comprises a power source 130 from the vehicle. A converter device 132 supplies a DC voltage. Connected across the converter device 132 are a series of three switches 134, 136 and 138. Preferably, switches are solid state switches such as MOSFETs. Each switch 134, 136 and 138 has an oscillator 142, 144 and 146, comprising a high frequency generator and two low frequency generators. The frequency of oscillator 142 is in the range of 500 to 50 kHz, preferably 10 kHz. The frequency of oscillator 144 is preferably between 10 and 50 Hz. Oscillator 146 has a frequency of between 0 and 10 Hz. A controller 148 is operably connected to each of the oscillators 142, 144, 146.

Figure 8:
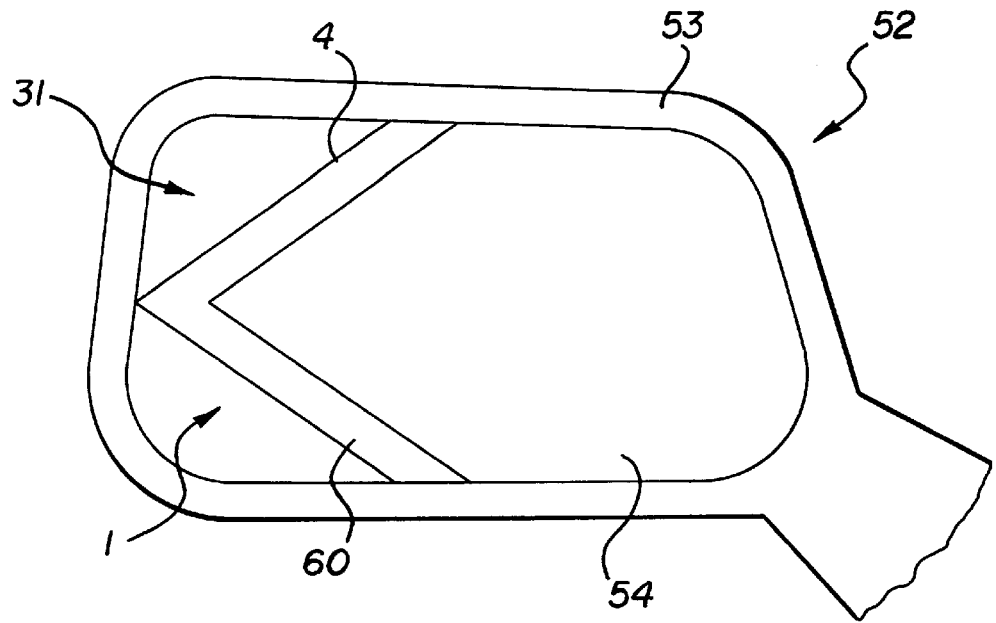
FIG. 8 is a graph of the output of the controller of FIG. 7.
Figure 9:
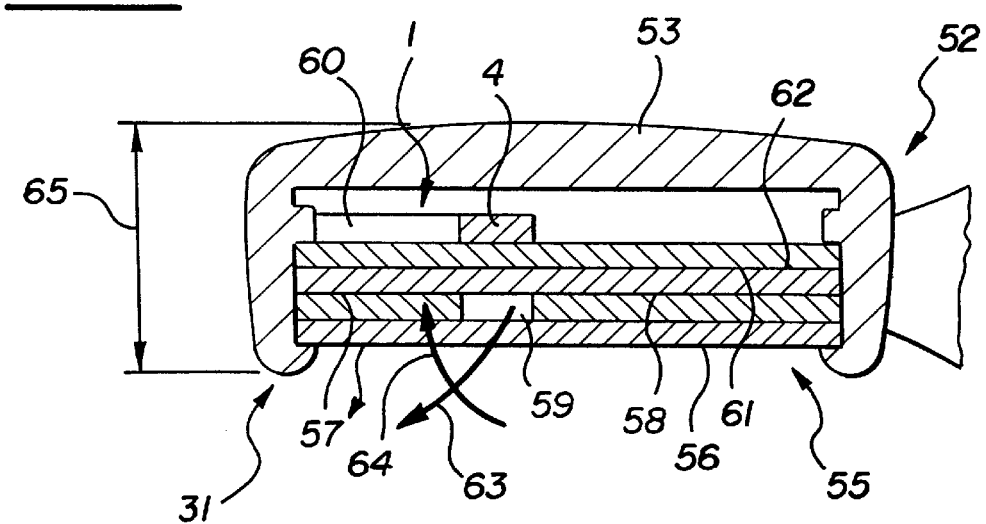
FIG. 9 is a plan view of the embodiment according to FIG. 8 in cross-section.
Figure 10:
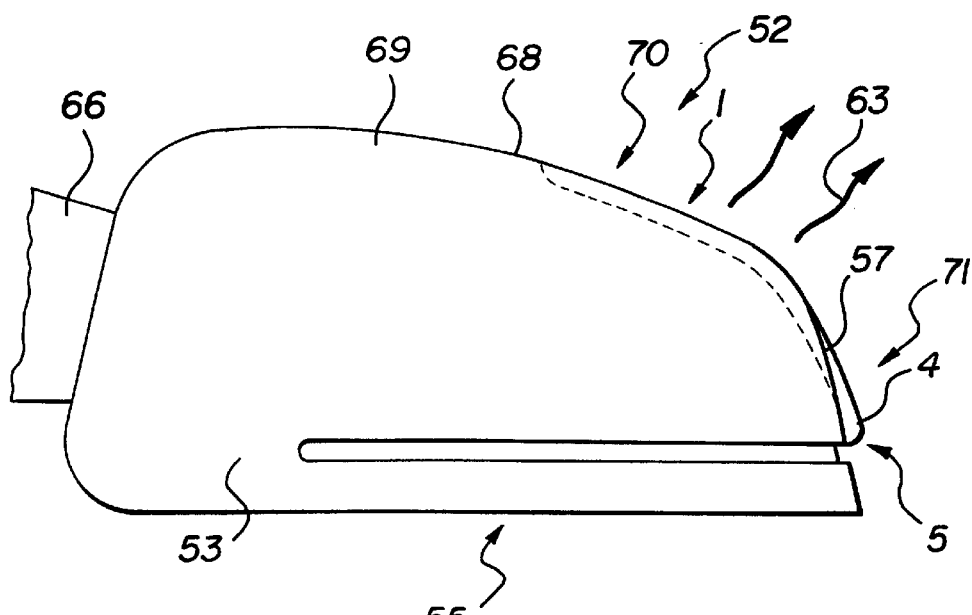
FIG. 10 is a further pictoral view of a field application of the lighting device according to the invention.
Figure 11:
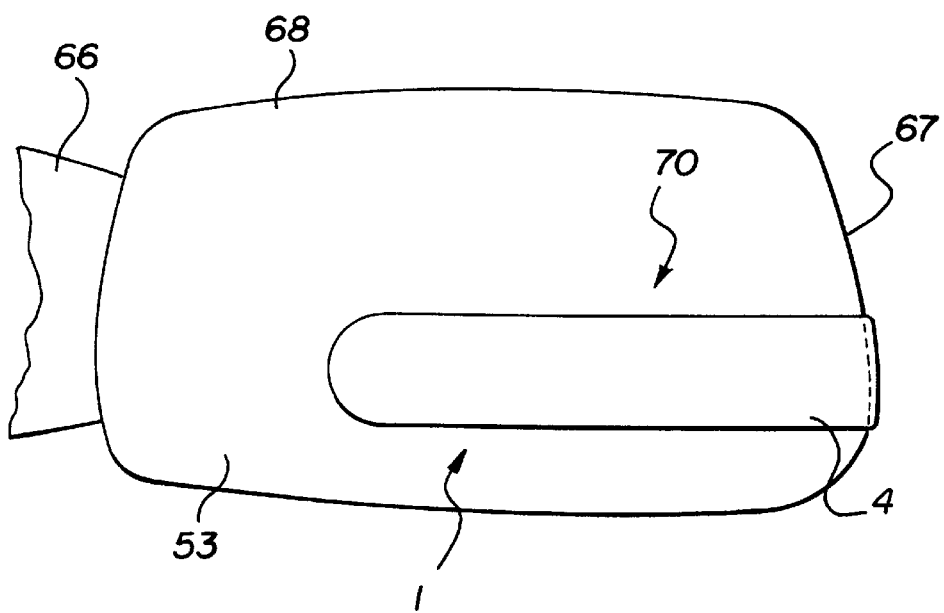
FIG. 11 is a rear view of the embodiment according to FIG. 10.

The controller 148 causes each of the oscillators to generate the respective waves, which triggers the switches 134, 136 and 138, respectively. The output is illustrated in FIG. 8. Since the three switches 134, 136 and 138 are connected in series, the lighting element 16 will only be energized when all three switches are closed. By varying the frequencies of the low frequency oscillators, a flashing pattern or a continuous lighting can be produced. If for example, the oscillator 146 is instructed to switch at 1 Hz, the lighting element 16 will flash at a frequency of 1 Hz. If set to a 0 frequency, lighting element 16 will continuously illuminate. Preferably, the oscillator 144 is set to switch at a frequency of 20 Hz that will present an apparent constant illumination.

It is possible to substitute the plurality of switches 134, 136, 138 with a single switch 134 generating a series of high frequency pulses.

Figure 3:
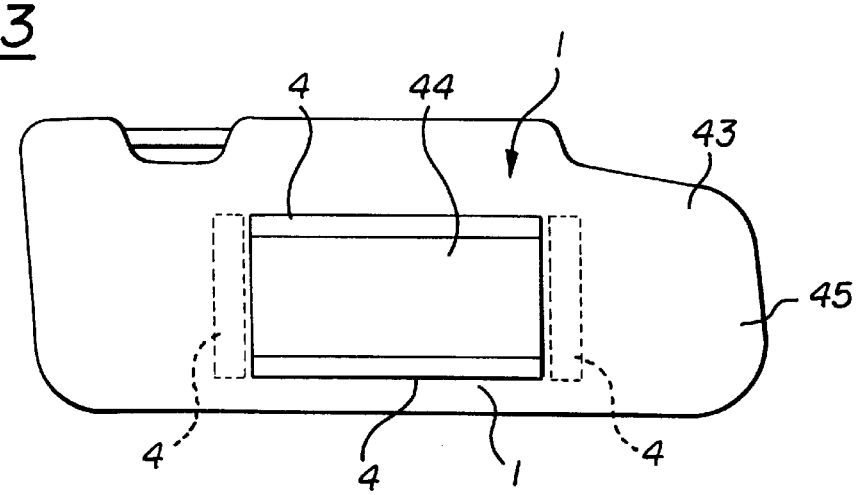
FIG. 3 is a top plan view of a second embodiment of a sun visor assembly of the present invention.
Figure 4:
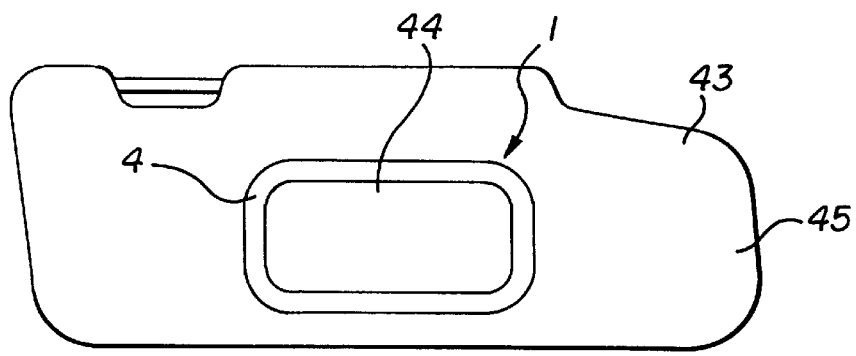
FIG. 4 is a cross-sectional view of the sun visor assembly of FIG. 3.

Referring now to FIGS. 3 and 4, a second embodiment of the present invention is illustrated. The sun visor 12 is the same as described in the first embodiment. The mirror 14 is provided with a hinged cover 50. The inside surface of the cover 50 has a lighting element 316. Cover 50 is operatively connected to the triggering device 42 such that opening of the cover is the external event for illuminating the lighting element 316.

Figure 5:
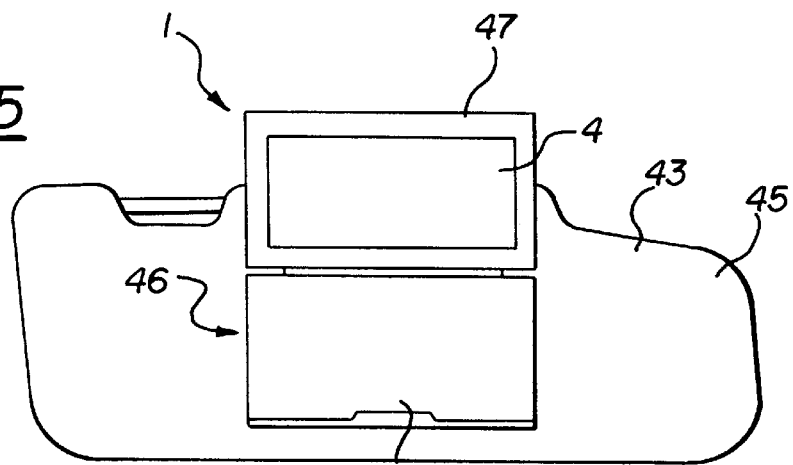
FIG. 5 is a top plan view of a third embodiment of a sun visor assembly of the present invention.

Referring to FIG. 5, a third embodiment of the present invention is illustrated. In this embodiment, the lighting element 416 has pictographic information on the exposed face such that symbolic representations, such as pictograms, symbols, advertising, or other images may be illuminated.

While the invention has been described in connection with what is presently considered to be the most practical and preferred embodiments, it is understood that the invention is not limited to the disclosed embodiments but, on the contrary, it intended to cover various modifications in the arrangements.

LIST OF REFERENCE NUMBERS 1. lighting device
2. receiving means
3. casing portion
4. lighting element
5. film
6. intermediate layer
7. carrier film
8. front edge
9. surface
10. reflectors
11. reflective coating
12. surface
13. cover layer
14. surface
15. surface
16. front surface
17. protective layer
18. reflectors
19. covering layer
20. connecting layer
21. contact terminal
22. contact terminal
23. cable
24. cable
25. supply and/or triggering device
26. power source
27. thickness
28. depth
29. rear of vehicle
30. vehicle
31. flashing device
32. brake light
33. brake light
34. frame
35. vehicle chassis
36. roof
37. vehicle door
38. vehicle door
39. reversing light
40. rear light
41. rear view mirror
42. rear view mirror
43. sun-shade
44. mirror
45. surface
46. recess
47. flap
48. joint arrangement
49. inner side
50. cut-out
51. cross piece
52. external mirror
53. casing
54. mirror surface
55. mirror device
56. glass
57. surface
58. mirror layer
59. free space
60. arrow
61. layer
62. deflecting layer
63. light beam
64. angle
65. thickness
66. retaining device
67. front surface
68. rear surface
69. outer side
70. recess
71. area
72. control device
73. power source
74. cable
75. cable
76. support condenser
77. converter device
78. supply cable
79. supply cable
80. consumer
81. switch device
82. switch device
83. switch device 84. high-frequency generator
85. output
86. low-frequency generator
87. output
88. low-frequency generator
89. output
90. control appliance
91. cable
92. cable
93. cable
94. point in time
95. duration
96. pulse
97. duration
98. high-frequency pulse
99. duration
100. point in time
101. frame
102. light-emitting side
103. glass
104. pressure plate
105. printed circuit board
106. components
107. thickness
108. resilient member
109. cover plate

What is claimed is:

1. A sun visor assembly for an automotive vehicle comprising:

a generally planar sun visor panel;

a reflective mirror mounted to said sun visor panel;

a liner fixedly mounted to said sun visor panel to define a recessed well in the face thereof adjacent a side edge of said mirror;

at least one lighting elements received in said well and fixedly mounted to said liner and aligned flush with said sun visor panel and said mirror, said lighting element comprising an electroluminescent film comprising at least one electroluminescent layer electrically connected to a triggering device for energizing said electroluminescent film for illuminating said sun visor panel and said mirror;

said electroluminescent film mounted within a carrier film fixedly secured in said well and enclosed by a transparent first protective layer, said carrier film having a inner reflective surface for reflecting light from said electroluminescent film towards said transparent first protective layer and said lighting element comprising a second protective layer having a plurality of optical elements formed thereon overlying said transparent first protective layer; and said triggering device generating a series of high frequency pulses between 500 Hz and 50 KHz thereby illuminating said lighting element in a continuous illumination.

2. A sun visor assembly as claimed in claim 1, wherein said triggering device generates a series of low frequency pulses between 0 and 20 Hz in series with said high frequency pulses.

3. A sun visor assembly as claimed in claim 2 further including first and second lighting elements positioned adjacent opposite side edges of said mirror.

4. A sun visor assembly as claimed in claim 3 wherein pictographic information overlies said electroluminescent film.

* * * * *

UNITED STATES PATENT AND TRADEMARK OFFICE
CERTIFICATE OF CORRECTION

PATENT NO. : 6,497,504 B2  
DATED : December 24, 2002  
INVENTOR(S) : Macher et al.

Page 1 of 1

It is certified that error appears in the above-identified patent and that said Letters Patent is hereby corrected as shown below:

Column 1,  
Line 63, delete "and".  
Line 66, delete "." and insert -- ; -- therefor.

Column 2,  
Line 2, delete "." and insert -- ; -- therefor.  
Line 4, delete "the" and insert -- a -- therefor.  
Line 4, delete "." and insert -- ; -- therefor.  
Lines 6 and 8, delete "." and insert -- ; -- therefor.  
Line 10, delete "." and insert -- ;and -- therefor.  
Line 19, delete "comprise" and insert -- comprises -- therefor.  
Line 30, delete "edge" and insert -- edges -- therefor.  
Line 34, delete "element" and insert -- elements -- therefor.  
Line 36, delete "the" and insert -- a -- therefor to read "a well 22".  
Line 45, delete "layer" and insert -- layers -- therefor.  
Line 51, insert -- 38 and 40 -- after "terminals".

Column 3,  
Line 31, insert -- panel -- after "visor" to read "visor panel 12".

Column 6,  
Line 11, delete "a" and insert -- an -- therefor.

Signed and Sealed this

Twenty-seventh Day of May, 2003

JAMES E. ROGAN  
*Director of the United States Patent and Trademark Office*